United States Patent
Marshall et al.

[11] Patent Number: 5,163,525
[45] Date of Patent: Nov. 17, 1992

[54] WEIGHING AND GROSS BAGGING APPARATUS

[75] Inventors: Donald G. Marshall, Hilliard; Donald O. Marshall, Columbus, both of Ohio

[73] Assignee: The Don Marshall Co., Hilliard, Ohio

[21] Appl. No.: 743,933

[22] Filed: Aug. 12, 1991

[51] Int. Cl.⁵ .................... G01G 13/16; G01G 13/34
[52] U.S. Cl. ..................................... 177/108; 177/112
[58] Field of Search ................................ 177/108–113

[56] References Cited

U.S. PATENT DOCUMENTS

| | | | |
|---|---|---|---|
| 420,789 | 2/1890 | Hart | 177/109 |
| 2,904,304 | 9/1959 | Zwoyer et al. | 177/108 |
| 4,193,465 | 3/1980 | Henry | 177/108 |

*Primary Examiner*—George H. Miller, Jr.
*Attorney, Agent, or Firm*—Francis T. Kremblas, Jr.

[57] ABSTRACT

An automated gross bagging scale apparatus combining manual actuation of the feed gate and a mechanical trigger mechanism with digital scale and control components permitting easy conversion of a fully mechanical bagging scale to a digital scale. The combination of mechanical features and digital control includes a load cell, digital controller and a solenoid actuated plunger rod which initiates the release of the feed gate arm from its latched open position to return to its normally closed position closing the gate which allows material to flow into the bagging chute. An electrical switch is actuated between on and off position by movement of the feed gate arm in a manner coordinated to permit the solenoid actuated plunger to be energized only when the feed gate arm is in the open position.

3 Claims, 3 Drawing Sheets

WEIGHING AND GROSS BAGGING APPARATUS

FIELD OF INVENTION

The present invention relates generally to weighing apparatus and particularly to gross bagging scales.

BACKGROUND ART

Apparatus for feeding and automatically weighing the gross weight of material fed into a bag or similar container are old and well-known in the art. Basically two types of conventional weighing units have been available for many years, one wholly mechanical and the other a fully automatic digital scale.

The mechanical version utilizes a hand lever to manually open the feed gate. The hand lever is held open by a trigger and latch mechanism. As the material flows into the bag, it is measured by a conventional pivoted beam and counterweight scale. Upon reaching a certain gross weight, a mechanical arm is contacted by an adjustable bolt on the scale beam which unlatches the hand lever to return to the closed position to close the feed gate.

In the fully automated, digital version of this type of apparatus, an air piston and cylinder arrangement operates the opening and closing of the feed gate. A conventional load cell and digital control means function to weigh the material fed into the bag, and at a set weight, energizes a solenoid to actuate the piston to close the gate.

It is generally well recognized in the trade that the digital scale arrangement is more accurate, reliable and convenient to use than the fully mechanical version. However, the very significant disadvantage of the present digital scale system is the dramatic increase in cost of such units compared to the mechanical bagging scales.

This high cost is particularly significant to the smaller business which has purchased and has been gainfully using a mechanical system. Replacement of an existing presently available mechanical system with automated digital unit represents an investment of several thousands of dollars. It is a reasonable estimate that over ten thousand of these mechanical bagging scales are presently in use. The useful life of a large majority of these scales has not been exhausted, therefore many users are reluctant to make the significant expenditure necessary to purchase the costly automated digital bagging scale with its attendant advantages over the mechanical version.

Therefore there has been an unsolved need for many years to provide an upgraded scale system which achieves the most important advantages of the automated digital systems without incurring the dramatic costs associated therewith and to make economic use of the existing mechanical versions presently in use.

SUMMARY OF THE INVENTION

The present invention relates generally to automated gross bagging systems and particularly to an improved mechanical and digital combination system and a method of converting a mechanical system into a digital type scale system having all the important advantages of a completely electronic digital grain bagging scale.

In general, the present invention comprises a gross bagging scale system wherein the gate controlling the flow of materials is manually actuated to an open position and integrated with electronic digital scale components to weigh the materials and automatically actuate the mechanical lever to close when the desired weight is obtained.

The electronic components employed replace certain of the typical mechanical components which are a source of inaccuracy and unreliability in a relatively simple manner and permit an existing conventional mechanical system to be converted into an electronic digital scale at relatively very low cost.

The resulting combination system eliminates the dashpot, counterweights and the adjustable bolt or abutment on the weighing beam which operates to initiate a halt in material feed. These mechanical components are the source of error due to friction and the necessary mechanical adjustments to set the desired weight. The dashpot is also very sensitive to temperature change and to ambient dust and dirt which represents another source of weighing error.

In accordance with the present invention, a conversion is made, using conventional components, which are easily incorporated into existing conventional mechanical systems with very minor adaptations of the structure already present in the mechanical system.

As another aspect of the present invention, the manual actuating lever controlling the feed gate and its associated mechanical linkages for automatically returning to a closed position remain essentially unchanged. A load cell replaces the conventional counterweights and is operatively connected to a digital controller which in turn is connected to a solenoid which actuates a plunger rod. The latter components function to initiate the release of the manual feed gate lever when the accurate desired weight has been fed into a bag container.

As another aspect of the present invention, the minimal physical adaptations of a conventional mechanical gross bagging system allows very simple and relatively quick conversion to be accomplished using a minimum of time, effort and new components to further reduce cost.

Therefore it is an object of the present invention to provide a gross bagging scale which combines both manually actuated mechanical components with electronic digital components in a manner which permits existing mechanical bagging scales to be converted to function with the advantageous accuracy and reliability of a new wholly electronically actuated, system at a dramatic reduction of cost to the user.

Figure 1:
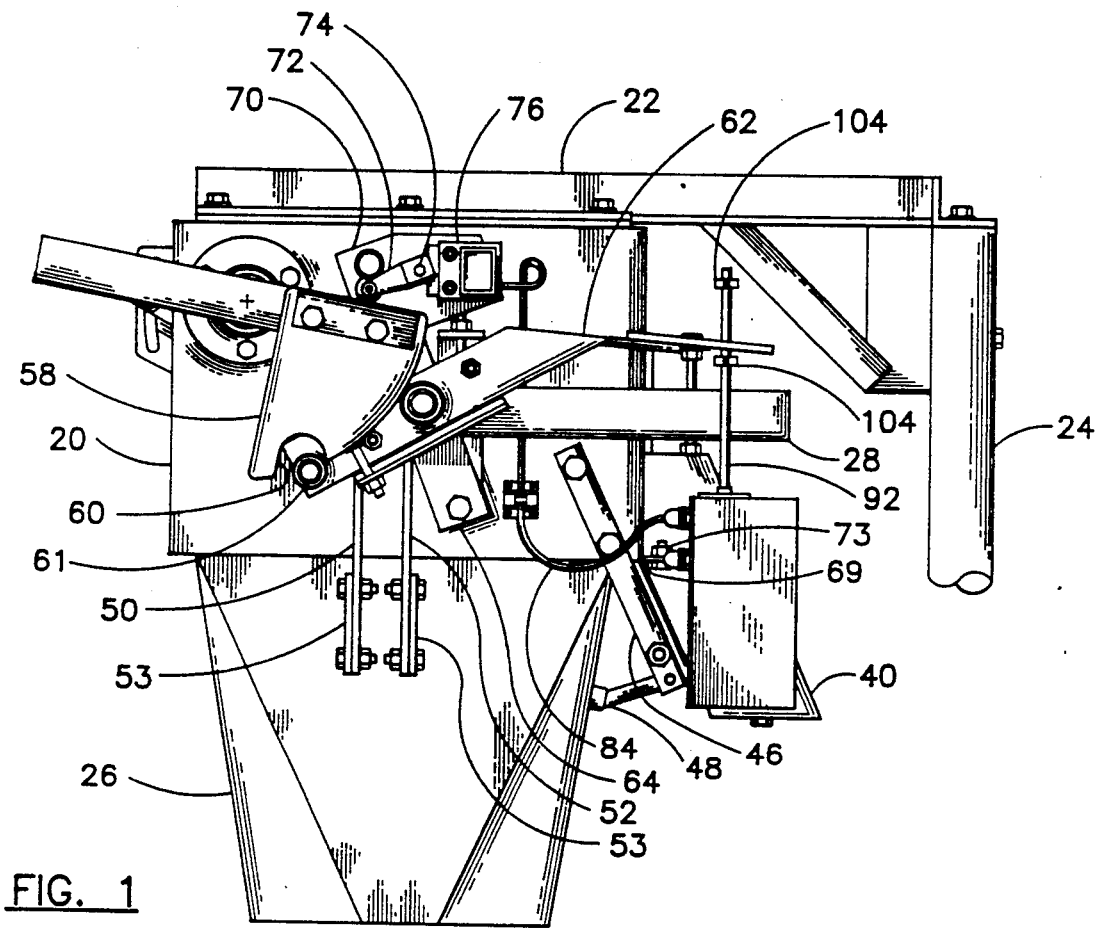
FIG. 1 is a side elevational view of a converted mechanical gross bagging scale system combining manual actuated mechanical functions with electronic digital components in accordance with the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

Figure 2:
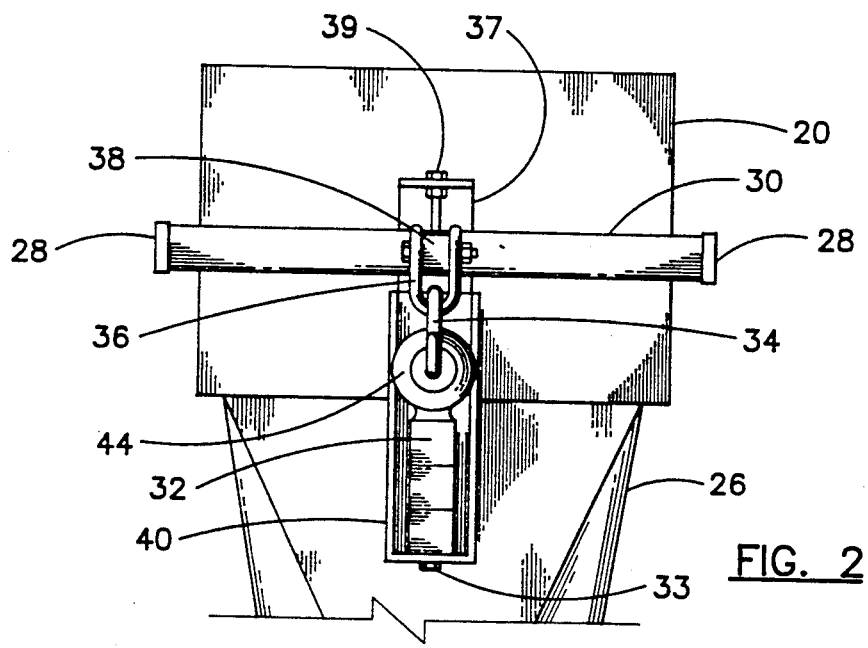
FIG. 2 is a rear elevational view of the apparatus shown in FIG. 1 showing only the weighing bar connecting the weighing arms to a load cell.
Figure 5:
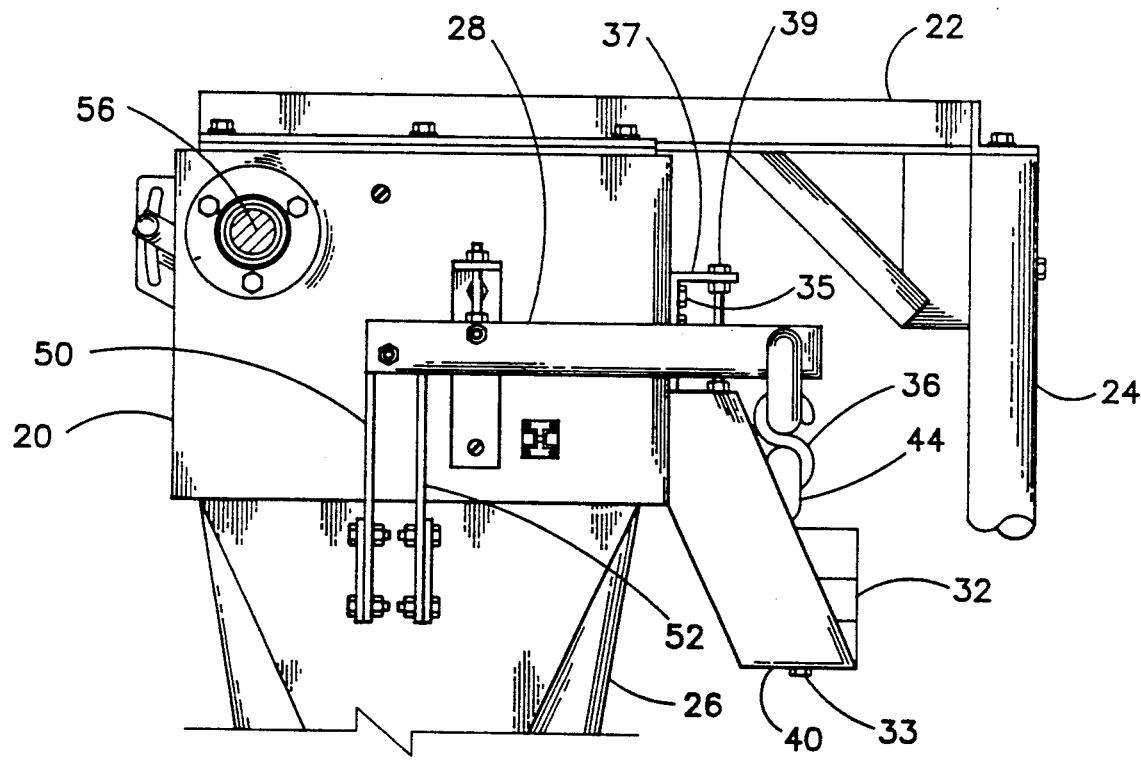
FIG. 5 is a side sectional elevational view of the apparatus shown in FIG. 4, the section being taken along line 5—5 in FIG. 4.

A gross bagging scale constructed in accordance with the present invention is shown in FIG. 1 and includes a feed bin 20 conventionally mounted to a supporting frame structure comprising an arm 22 and post 24 and associated braces. With reference to FIGS. 1 and 5 a weighing chute assembly 26 is operatively connected to feed bin 20 in a conventional well-known manner. Chute or spout assembly 26 is conventionally suspended under feed bin 20 to one end of a pair of scale beams 28 which in turn are pivotally mounted to the side walls of feed bin 20. The opposing end of scale beam 28 are connected to one another by a fixed arm 30 as seen in FIG. 2. A conventional load cell or strain gauge 32 is operatively connected to arm 30 via S-hook 34 connected to U-shaped connector 36 mounted to a flange 38 fixed to arm 30.

Load gauge 32 is fixed at its lower end via bolt 33 to a specially adapted mounting bracket 40 which includes a mounting flange 37 which is conventionally fixed to the side of feed bin 20 via suitable bolts such as 35.

An adjustable threaded fastener 39 and accompanying nut extends vertically through a suitable hole in the horizontal portion of flange 37 and functions as an adjustable stop limiting the upward extent of movement of bar 30.

Bracket 40 is provided with an outwardly angled lower portion so as not to interfere with the stabilizing connection supporting weighing chute 26 from bin 20 represented by arms 46 and 48.

The opposing end of each weighing beam 28 is operably connected to a pair of support arms 50 and 52, each pair of arms 50 and 52 in turn, are connected to opposing sides of chute 26 via brackets 53 fixed to chute 26 such that the weight of a bag mounted on chute 26 represents an applied force on the opposing end of beams 28. This force is sensed by load cell 32 in the conventional manner well-known in the art.

A manually actuated feed gate lever or handle 54 is connected to a rotatable shaft 56 extending through and supported within bin 20 in a well-known manner to conventionally operate a gate, not shown, within bin 20 to permit the contents of bin 20 to be selectively fed into chute 26. The opposite end of handle 54 includes an arcuate shaped latch and trigger mechanism 58 which is provided with a recess or detent 60 adapted to receive a bearing 61 fixed on a bearing arm 62. Arm 62 is pivoted at 63 to a support bar 64 fixed in a position outwardly of bin 20 via a pair of spacer members 66. Spacer members 66, in turn, may be fixed in any conventional manner to bin 20.

Figure 3:
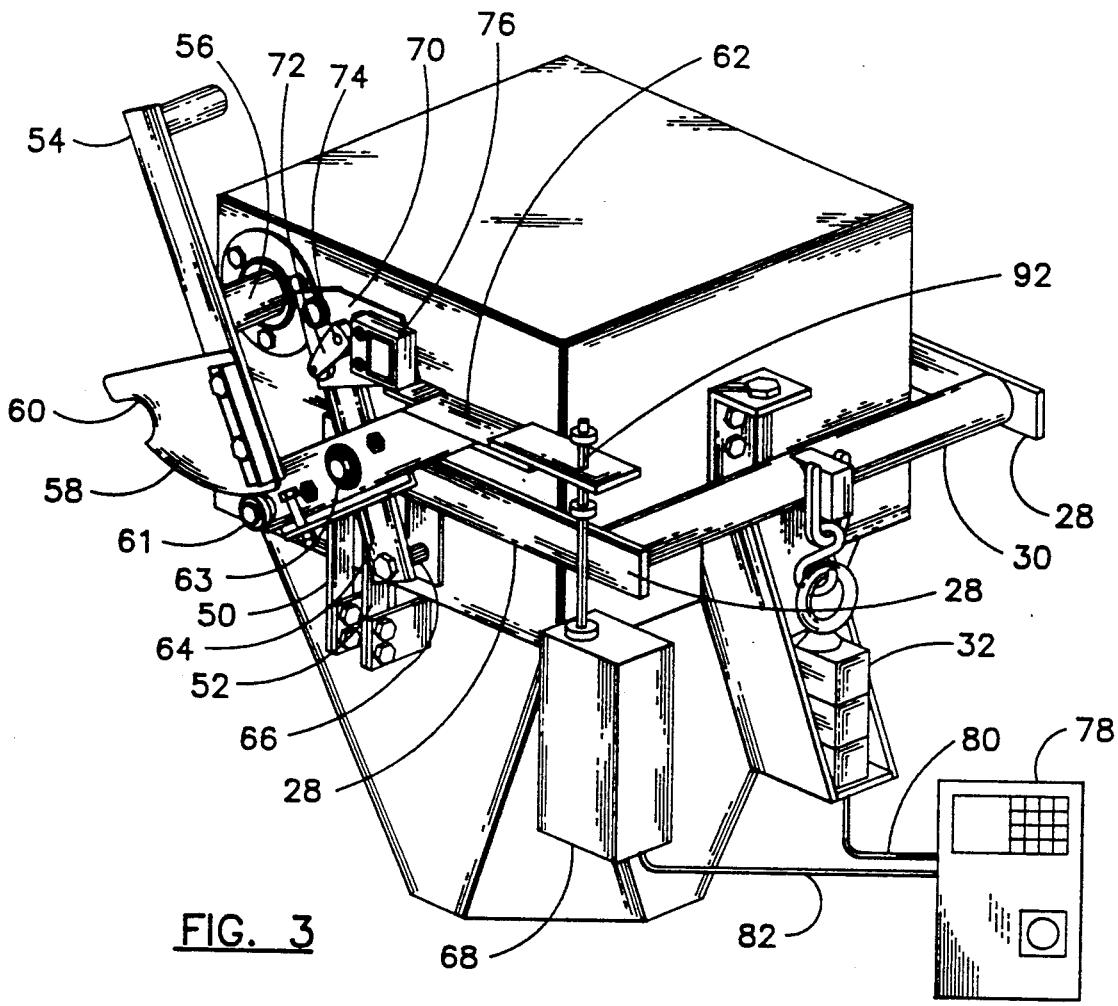
FIG. 3 is a perspective view of a converted mechanical gross bagging scale system constructed in accordance with the present invention.
Figure 4:
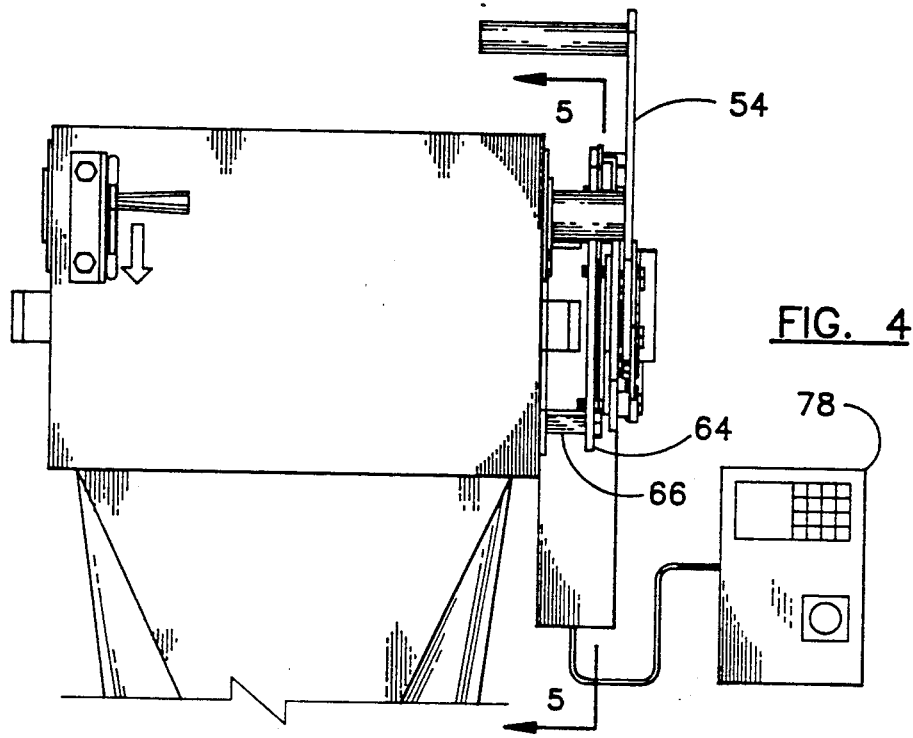
FIG. 4 is a front elevational view of the apparatus shown in FIGS. 1 and 3 including a diagrammatic illustration of a conventional digital control system.

The angular outer end of bearing arm 62 is disposed generally horizontally when the handle 54 is in the normally closed position seen in FIG. 3. Bearing arm 62 includes a hole for accepting a rod actuated by a conventional solenoid mounted in control box 68 as will be described in detail later herein.

The upper end of support bar 66 carries a mounting plate 70 to which a switch arm 72 of electric switch 76 is pivotally mounted at 74. Switch arm 72 is movable to a raised on position which actuates the electrical components. It is biased to return to a lowered, normal off position. Switch arm 72 is operably connected to a conventional electric switch 76, also mounted on plate 70, which activates the electric circuit connection between the digital controller box 78 and the solenoid in control box 68.

The normal closed position of switch arm 72 is shown in FIG. 3 with handle 54 in its raised, normally closed position. Upon manual actuation of handle 54 to its lowered position, which opens the gate in bin 20 as shown in FIG. 1, the upper surface of the outer end of handle 54 engages a roller mounted on the end of switch arm 72 causing arm 72 to be pivoted upwardly to its on position. In this on position controller 78 is operatively connected to the solenoid in box 68 to control the filling and weighing cycle.

In this raised position of handle 54 shown in FIG. 1, the outer end of bearing arm 62 is pivoted downwardly as bearing 61 moves along the arcuate surface of latch 58. Bearing arm 62 and handle 54 are held in this position when bearing 61 is received within the knife-edge of detent or recess 60. At the same time, switch arm 72 is held in the on position described above herein activating the electrical circuit between controller 78 and control boxes 68.

Controller 78 is provided with a conventional digital control circuit and includes a visual read out window indicating weight and appropriate signal circuitry permitting one to set a predetermined actuating signal related to the weight sensed by load cell 32. Upon reaching the set weight, a control signal is generated which is fed to solenoid control box 68. The control circuitry in control box 78 is conventionally communicated to load cell 32 via electrical cable 80 and the solenoid in box 68 via cable 82. Another electrical cable 84 is conventionally connected between switch 76 and control box 68.

Control box 68 may be fixed in any conventional manner to feed bin 20 such as by a plate 69 welded to bin 20 to which a flange 71 on box 68 may be bolted such as 73 or otherwise positioned to dispose the plunger rod in a position to engage bearing arm 62.

Figure 6:
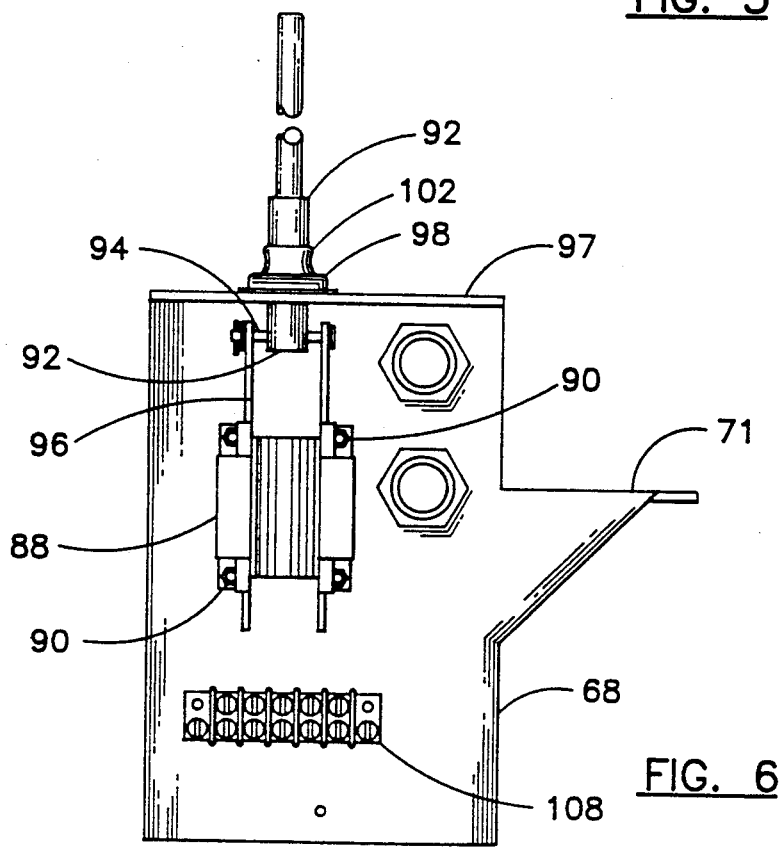
FIG. 6 is a side elevational view of the solenoid actuated rod assembly forming a portion of the apparatus shown in FIG. 1, the actuating portion being illustrated apart from the remaining apparatus.

As best seen in FIG. 6, a view of the interior elements of control box 68 is shown. A conventional commercially available push-pull solenoid 88 is fixedly mounted to an interior wall of box 68 via bolts, such as 90. A rod 92 is pivotally mounted to a shaft 94 connected between the ends of a pair of arms 96 forming a plunger at the push end of solenoid 88. Rod 92 extends upwardly through an opening in the top side 97 of box 68. The opening is significantly larger than the diameter of rod 92 to allow the rod limited movement about shaft 94. A pliable or flexible rubber or plastic seal 98 is mounted over the rod opening and is provided with a hole sealingly engaging the diameter of rod 92 to keep dust or dirt and the like from entering control box 68.

Arms 96 are fixed to the core of solenoid 88 and are conventionally slideably mounted for vertical movement upon energizing the windings of the solenoid. As shown in FIG. 6, arms 96 are in the energized, raised position. Upon de-energization, the arms 94 fall due to gravity to return to the normal de-energized position also pulling rod 92 to its lowered position.

Seal 98 is a conventional commercially available seal of the type having a central recess surrounding the opening in seal through which rod 92 is extended. This recess is provided with an excess of material 102 which moves with rod 92 through the opening in top 97 of box 68.

The upper end of rod 91 extends through a hole or opening in bearing arm 62 and is provided with threaded or pinned stops 104 vertically spaced along rod 92 above and below arm 62.

The flexible seal 68 permits rod 92 to pivot to a slightly canted position, such as seen in FIG. 1, when bearing arm 62 is pivoted by movement of handle 54 and latch 58 to the open or fill position illustrated in FIG. 1.

Upon receiving a signal from the control circuit in controller 78 related to the signal generated by load cell 32 indicating the set weight has been reached, solenoid 88 is energized to push arms 96 and rod 92 upwardly causing the lower stop 104 to strike the outer end of bearing arm 62. This causes the opposing end of bearing arm 62 and bearing 61 to pivot away from recess 60 to free handle 54 to return to its original position. This also causes the gate in bin 20 to close stopping further flow into chute 26.

This movement of handle 54 and latch 58 also permits switch arm 72 to return to its normally closed position to de-energize the connection between controller 78 and solenoid 88. Plunger arms 96 and rod 92 are then permitted to fall to their de-energized position and bearing arm 62 returns to its original starting position as illustrated in FIG. 3.

A conventional multiple electric contact strip 108 is mounted within control box 68 and is conventionally wired between solenoid 88 and cables 80, 82 and 84 to provide the desired electrical connections between components.

Any conventional bag holding device may be conventionally mounted to the lower end of chute 26 as is well-known in the art, however, such a device is not shown or described herein as it is unnecessary to the understanding of the present invention to one of ordinary skill in the art.

Each bag to be filled is releasably fastened to chute 26 to receive a predetermined amount of flowable material from bin 20. A predetermined set weight is set upon manipulation of conventional controls on controller 78. Then handle 54 is manually pulled downwardly to the latched position described herein to begin the filling operation and move switch arm 72 to its on position. Upon reaching the set weight determined by the signal from load cell 32 fed to the control circuit in controller 78, controller 78 generates a signal to energize solenoid 88 to cause rod 92 to strike bearing arm 62. This releases handle 54 to return to its normally closed position stopping flow into chute 26 as earlier described and permits switch 72 to return to its biased off position de-energizing solenoid 88. Rod 92 is returned to its normally lowered position.

Upon removing the filled bag, a new bag is mounted on chute 26 and the filling cycle is repeated.

It should be noted that the typical counterweight usually attached to bar 30, the dashpot, and the adjustable threaded stop typically mounted on bearing arms 28 to cause release of bearing arm 62 are eliminated from a typical fully mechanical bagging scale. The load cell 32, and the electrical components are easily mounted to an existing mechanical version with control box 68 and rod 9 to quickly and inexpensively convert the scale to a digital version having a positive actuating means to release the handle 54 to its closed position. The remaining components of the mechanical version, which are not significant sources of weighing error, can be used advantageously without the significant cost of a new digital bagging apparatus.

While certain preferred embodiments of the present invention have been disclosed in detail, it is to be understood that various modifications may be adopted without departing from the spirit of the invention or scope of the following claims.

We claim:

1. In a gross bagging scale apparatus of the type having a feed bin and movable gate and a weighing chute adapted to receive a bag container to be filled with a given weight of material, and a rotatable feed gate arm operatively connected to said gate and movable between an open and a normally closed position, a pair of scale beams operatively connected to said weighing chute and a releasable trigger mounted on one end of said feed gate arm, the combination of:
   a) a bearing arm pivotally mounted to said bin having a first end engageable with said trigger and including means releasably latched to said trigger when said feed gate arm is in said open position and an opposite second end;
   b) a solenoid actuated plunger rod mounted in adjacent relationship to said bin between a first and second position, one of said positions engaging the second end of said bearing arm to cause said bearing arm to move to an unlatched position relating to said trigger;
   c) electric switch means mounted in close relationship to said bin and including a switch arm mounted for movement to an on position from a normal off position, said switch arm being disposed to be engaged by said feed gate arm to move to said on position when said feed gate arm is in said open position;
   d) a load cell operatively connected to the opposite end of said scale beams to measure force signals generated by the weight added to said weighing chute; and
   e) control means operatively connected to said load cell, said solenoid actuated plunger and said switch means to measure said force signal from said load cell and to generate an energizing signal to said solenoid actuated plunger rod to engage said bearing arm upon receiving a predetermined weight signal from said load cell, whereby said plunger rod causes said bearing arm to move to an unlatched position permitting said feed gate arm to return to its closed position preventing further flow of material from said feed bin.

2. The apparatus defined in claim 1 including an enclosure housing a solenoid having a pair of arms vertically movable between a raised activated position and a lowered unactivated position; and said plunger rod being mounted for vertical movement through a top opening in said enclosure and pivotally connected about the horizontal axis of a pin connected between said arms of said solenoid, the pivotal movement of said plunger rod being restricted by the sides of said opening in said enclosure.

3. The apparatus defined in claim 2 including a flexible seal having a central opening sealingly accepting said plunger rod and being mounted over said opening in said enclosure, said opening having a width greater than the diameter of said plunger rod in a perpendicular direction to the axis of said pin connected between said arms of said solenoid degree of pivotal movement of said plunger rod, and wherein a second opening is provided near the second end of said bearing arm and the upper portion of said plunger rod extends through said second opening; and a pair of stop means mounted on an upper end portion of said plunger rod, a respective one of said stop means spaced axially above and below the second opening for engaging said bearing upon vertical movement of said plunger rod responsive to actuation of said solenoid.

* * * * *